US011986937B2

(12) United States Patent
Wetrich et al.

(10) Patent No.: US 11,986,937 B2
(45) Date of Patent: May 21, 2024

(54) TOOL HOLDER INCLUDING A THREADED ACTUATOR

(71) Applicant: The Wooster Brush Company, Wooster, OH (US)

(72) Inventors: Brian S. Wetrich, Canton, OH (US); John L. Scott, Sr., Wooster, OH (US); Everett A. Crosby, Homerville, OH (US)

(73) Assignee: The Wooster Brush Company, Wooster, OH (US)

( * ) Notice: Subject to any disclaimer, the term of this patent is extended or adjusted under 35 U.S.C. 154(b) by 765 days.

(21) Appl. No.: 17/151,396

(22) Filed: Jan. 18, 2021

(65) Prior Publication Data

US 2021/0229244 A1 Jul. 29, 2021

Related U.S. Application Data

(60) Provisional application No. 62/965,420, filed on Jan. 24, 2020.

(51) Int. Cl.
*B25B 9/04* (2006.01)
*B25H 1/00* (2006.01)

(52) U.S. Cl.
CPC ............. *B25B 9/04* (2013.01); *B25H 1/0021* (2013.01)

(58) Field of Classification Search
CPC .......... B25B 9/04; B25H 1/0021; B25H 1/00; F16B 21/06; F16B 21/065; F16B 21/07;
(Continued)

(56) References Cited

U.S. PATENT DOCUMENTS 4,614,452 A * 9/1986 Wang ...................... F16C 11/10 403/97
5,626,320 A * 5/1997 Burrell .................. B64D 43/00 248/231.71

(Continued)

FOREIGN PATENT DOCUMENTS

GB 2350345 A * 11/2000 ......... B65D 73/0078

OTHER PUBLICATIONS

Oberg, Erik, 26th Ed. Machinery Handbook, Industrial Press Inc., 2000, pp. 1792-1795, 1800-02, 1817-19. (Year: 2000).*

*Primary Examiner* — Eric J Rosen
*Assistant Examiner* — Kent N Shum
(74) *Attorney, Agent, or Firm* — Renner, Otto, Boisselle & Sklar, LLP

(57) ABSTRACT

A tool holder for firmly holding a wide range of sizes and shapes of tool handles includes a holder handle, a cage assembly, a clamp, a locking coupling, and a threaded actuator. The cage assembly includes a pair of axially spaced apart supports having axially aligned through openings sized for receiving tool handles of different sizes and shapes. The clamp is transversely movable between the supports in opposite directions for releasably clamping the tool handle against the supports. The locking coupling is interposed between the holder handle and the cage assembly for selectively adjusting the angular orientation of the cage assembly relative to the holder handle. The threaded actuator is operable to lock or unlock the locking coupling for permitting or restricting adjustment of the angular orientation of the cage assembly relative to the holder handle.

20 Claims, 11 Drawing Sheets

(58) Field of Classification Search
CPC ...... F16B 21/073; F16B 21/08; F16B 21/086; F16B 41/002
USPC ........ 269/16, 37, 38, 50, 52, 58, 59, 63, 64; 411/107, 999
See application file for complete search history.

(56) References Cited

U.S. PATENT DOCUMENTS

| | | | | |
|---|---|---|---|---|
| 6,093,878 | A * | 7/2000 | Hoshino | G10D 13/063 84/421 |
| 6,293,723 | B1 * | 9/2001 | Kiefer | B60N 2/929 403/21 |
| 6,815,598 | B1 * | 11/2004 | Liao | G10D 13/02 84/421 |
| D739,710 | S | 9/2015 | Bukovitz et al. | |
| 9,701,009 | B2 | 7/2017 | Bukovitz et al. | |
| 9,808,929 | B2 | 11/2017 | Bukovitz et al. | |
| 2001/0045448 | A1 * | 11/2001 | Kane | B23K 37/0533 219/60 A |
| 2002/0172574 | A1 * | 11/2002 | McCormack | F16B 5/0208 411/352 |
| 2003/0175091 | A1 * | 9/2003 | Aukzemas | F16B 41/002 411/107 |
| 2005/0089358 | A1 * | 4/2005 | Py | A45D 34/04 401/40 |
| 2010/0132163 | A1 * | 6/2010 | Hasei | A01D 34/90 16/421 |
| 2011/0038125 | A1 * | 2/2011 | Cao | H01L 23/4006 361/720 |
| 2014/0318999 | A1 * | 10/2014 | Liang | B65D 5/4208 206/349 |
| 2015/0367500 | A1 * | 12/2015 | Bukovitz | F16B 2/18 248/514 |
| 2016/0273865 | A1 * | 9/2016 | Banes | F16M 13/02 |
| 2020/0254603 | A1 * | 8/2020 | Murrow, Jr. | B25G 3/38 |

* cited by examiner

TOOL HOLDER INCLUDING A THREADED ACTUATOR

RELATED APPLICATIONS

This application claims the benefit of U.S. Provisional Application No. 62/965,420 filed Jan. 24, 2020, which is hereby incorporated herein by reference in its entirety.

TECHNICAL FIELD

The present invention relates generally to tool holders, and more particularly to a tool holder such as for use with an extension pole that is capable of firmly holding different tools having a wide range of tool handle sizes and shapes, and which may be adjustable to provide a wide range of angles to permit the tool to reach odd angles at various heights.

BACKGROUND

Tool holders that are designed to mount a tool on an extension pole have been used to reach elevated locations or other difficult-to-reach spaces. Commonly such tool holders are used by painters for holding paint brushes, paint rollers, scrapers or the like. Such tool holders may be adaptable to hold various tool handle sizes and may be adjustable to different angles as may be desired for the particular application. There is an ongoing need to simplify the construction and operation of such tool holders. In addition, there is an ongoing need to improve the display packaging for such tool holders.

SUMMARY

An aspect of the present invention provides a tool holder that facilitates ease of use and/or has a simpler construction than other conventional tool holder designs.

Another aspect of the present invention provides display packaging that protects and holds the tool holder while also permitting a potential buyer to feel and/or at least partially test portions of the tool holder.

According to an aspect of the invention, a tool holder for firmly holding a wide range of sizes and shapes of tool handles includes: a holder handle; a cage assembly, the cage assembly comprising a pair of axially spaced apart supports having axially aligned through openings formed by respective inwardly facing surfaces of the supports, in which the openings are sized for receiving tool handles of different sizes and shapes through both of the aligned openings; a clamp transversely movable between the supports in opposite directions toward and away from the respective inwardly facing surfaces of the supports for releasably clamping the tool handle against the inwardly facing surfaces; a locking coupling interposed between the holder handle and the cage assembly for selectively adjusting the angular orientation of the cage assembly relative to the holder handle; and a threaded actuator that is operable to interact with the locking coupling for permitting or restricting adjustment of the angular orientation of the cage assembly relative to the holder handle.

According to another aspect of the invention, a tool holder is provided in combination with a display packaging box.

According to another aspect of the invention, a display packaging box includes: sidewalls that enclose a space, the box having an open bottom and being configured to at least partially contain a tool holder having: a holder handle; a cage assembly comprising a pair of axially spaced apart supports having axially aligned through openings; and a clamp movable between the supports for releasably clamping the tool handle against the supports; wherein the open bottom of the box is configured to allow a majority of the cage assembly to be disposed outwardly of the packaging at a bottom of the box.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
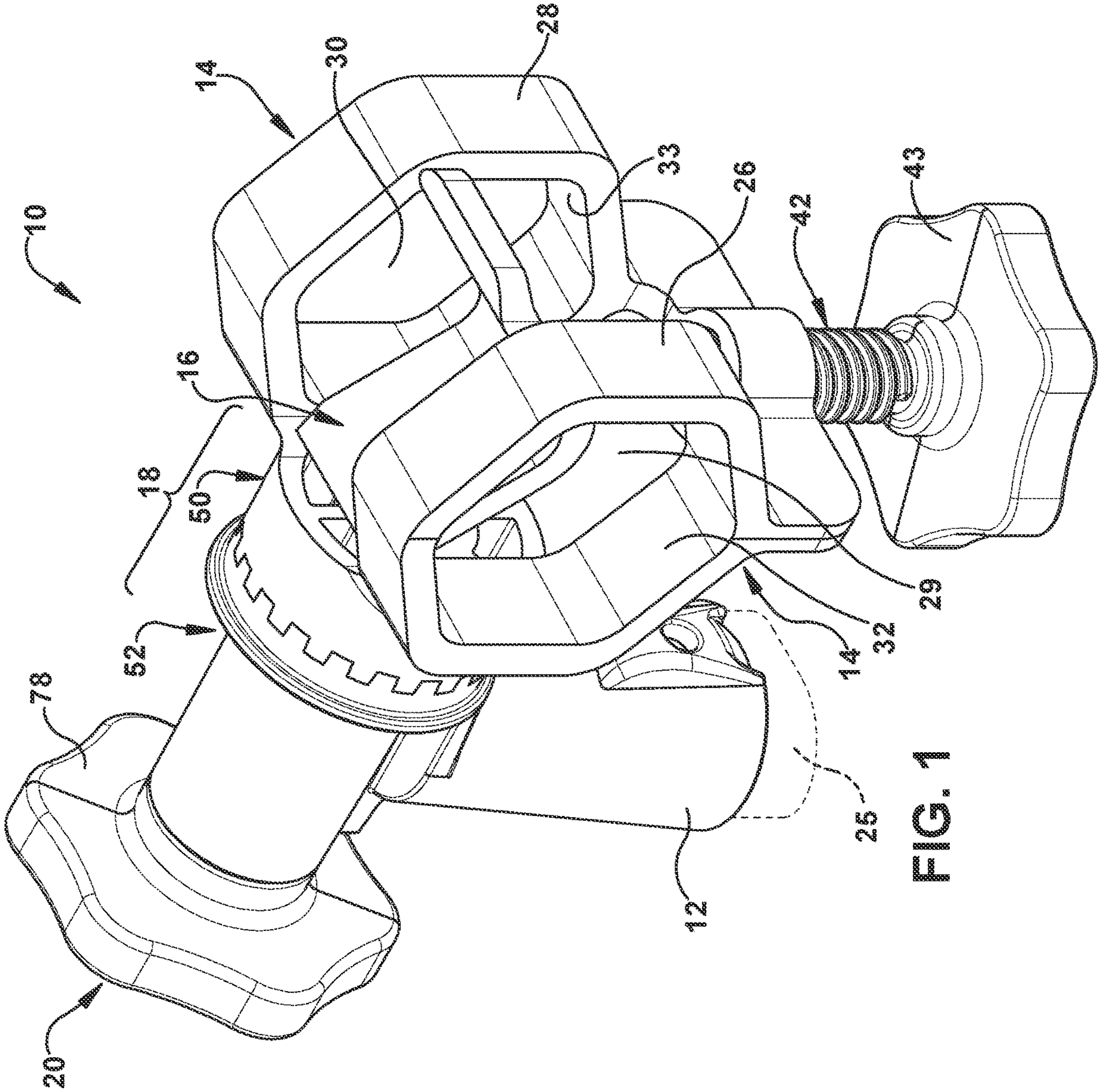
FIG. 1 is a perspective top view of an exemplary tool holder according to an embodiment of the present invention.
Figure 2:
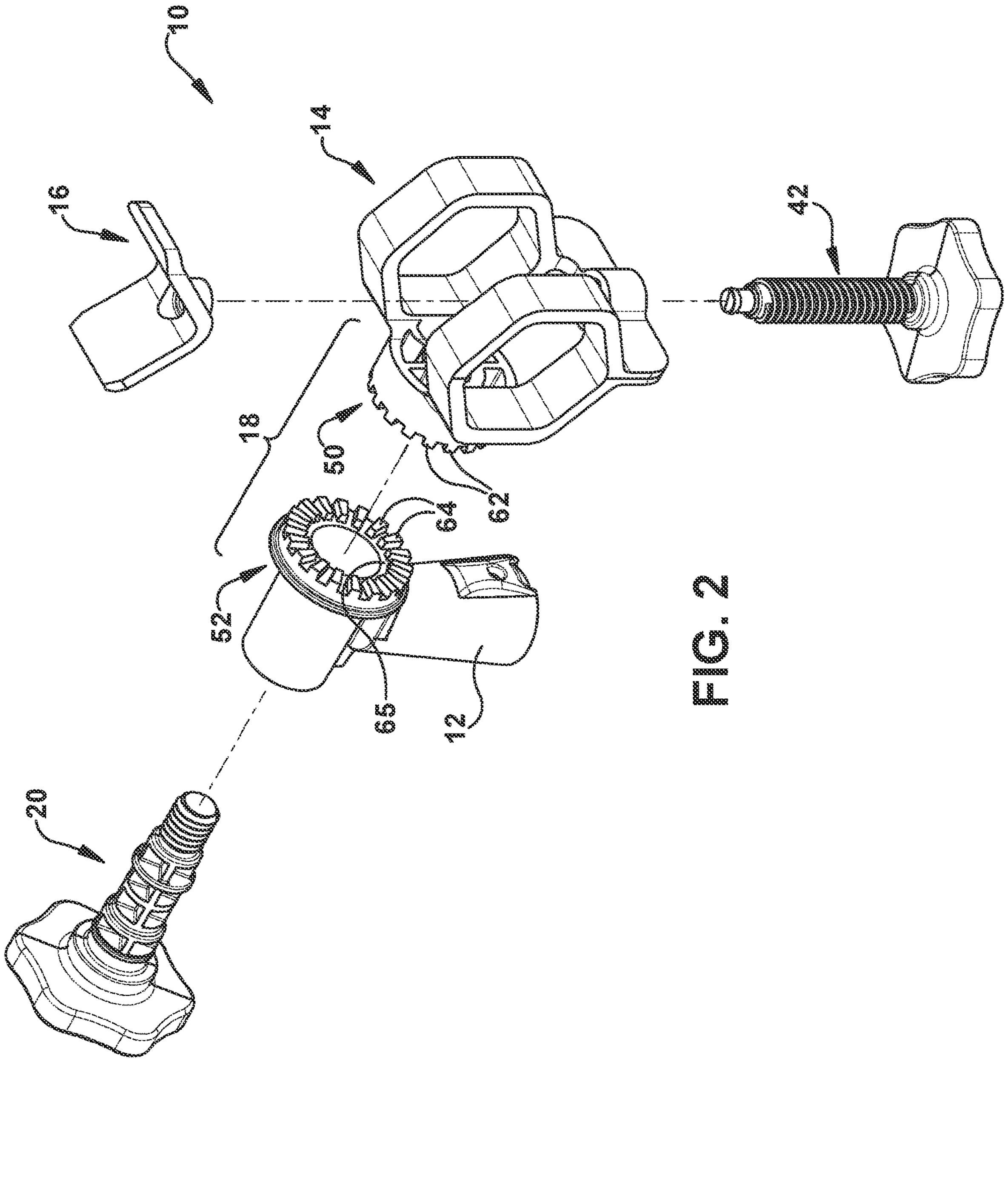
FIG. 2 is an exploded perspective view of the tool holder in FIG. 1.
Figure 4:
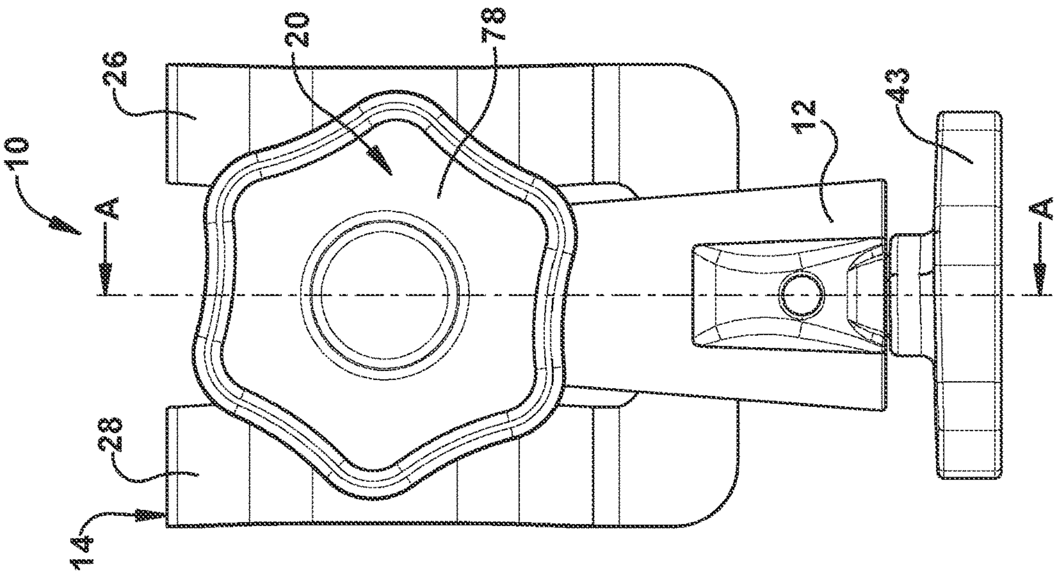
FIG. 4 is a left side view of the tool holder.

Referring to FIGS. 1-9, an exemplary embodiment of a tool holder 10 is shown. The tool holder 10 generally includes a holder handle 12 for coupling to an extension pole, and a cage assembly 14 that cooperates with a clamp 16 for firmly holding different tools having a wide range of tool handle sizes and shapes. A locking coupling 18 is provided for enabling the cage assembly 14 to be indexable relative to the holder handle 12 to a wide range of angles to permit tools firmly held thereby to reach different angles at various heights. In addition, a threaded actuator 20 is provided that is operable to lock or unlock the locking coupling for permitting or restricting the angular adjustment of the holder handle 12 and cage assembly 14 relative to each other, as will be described in further detail below.

The holder handle 12 extends along a vertical axis and contains a threaded socket 22 that permits the holder handle 12 to be threadably attached to virtually all standard threaded extension pole tips. Alternatively or additionally, the socket 22 may be provided with a larger diameter non-circular recess 24 adjacent its outer end for establishing an anti-rotation connection with a quick release lock mechanism for extension pole tips of the type disclosed, for example, in U.S. Pat. No. 5,288,161 by the same assignee as the present disclosure, the entire disclosure of which is incorporated herein by reference. Such an extension pole 25 is shown in phantom view in FIG. 1.

The cage assembly 14 includes a pair of axially spaced apart supports 26, 28 having respective axially aligned through-openings 29, 30. The through-openings 29, 30 are formed by respective radially inwardly facing surfaces 32, 33 of the supports 26, 28, and are sized for receiving tool handles of different sizes and shapes through both aligned openings 29, 30. The clamp 16 is transversely movable between the supports 26, 28 in opposite directions toward and away from the inwardly facing surfaces 32, 33. The clamp 16 is configured to releasably clamp a tool handle (not shown) extending axially through both aligned openings 29, 30 against the inwardly facing surfaces 32, 33 of the supports 26, 28.

In the illustrated embodiment, the clamp 16 is formed as a cradle having arm sections with engagement surfaces 34, 36 that form a generally V-shape for supporting the tool. As shown, the width of the clamp 16 is slightly less than the spacing between the supports 26, 28 for enabling the clamp 16 to move therebetween. Also as shown, opposite ends 35, 37 of the arm sections of the clamp 16 may extend laterally outwardly beyond the openings 29, 30 in the supports 26, 28 for guiding of the clamp 16 during transverse movement between the supports 26, 28.

In exemplary embodiments, the inwardly facing surfaces 32, 33 of the respective supports 26, 28 each have upper angled portions 38, 39 that form a generally inverse shape substantially corresponding to the shape of the engagement surfaces 34, 36 of the clamp 16. In the illustrated embodiment, the inwardly facing surfaces 32, 33 of the respective supports form hexagonally-shaped openings 29, 30, in which the respective angled portions 38, 39 of each support 26, 28 are oriented relative to each other at an included angle of approximately 120°. Such hexagonally-shaped openings may enable the clamp 16 and supports 26, 28 to receive handles of different sizes and shapes after the clamp 16 has been moved sufficiently far away from the inwardly facing wall surfaces 32, 33 to allow for insertion of the tool handle within the space therebetween. As evident from the figures, the further the clamp 16 is moved away from the inwardly facing surfaces 32, 33 of the supports 26, 28, the larger the open space therebetween for receipt of larger and/or different handle shapes. The configuration of the clamp 16 and supports 26, 28 also enables the clamp 16 and supports 26, 28 to more firmly hold tool handles of different sizes and shapes therebetween when a clamping force is applied to the clamp 16, thereby urging the clamp 16 toward the inwardly facing wall surfaces 32, 33.

The transverse movement of the clamp 16 between the supports 26, 28 may be accomplished by operatively coupling the clamp 16 to an axial end of a screw 42 threadedly received in a threaded bore 44 in a crossmember 46 that extends between the ends of the supports 26, 28 opposite the inwardly facing wall surfaces 32, 33. As shown, the threaded bore 44 may be formed in the crossmember 46 substantially in line with the approximate center of the axial space between the supports 26, 28. In exemplary embodiments, the respective threads of the threaded bore 44 and screw 42 may be double-lead ACME threads, which may improve the strength of the threads and may reduce the number of turns to tighten or loosen the clamp 16. The end of the screw 42 also may include a hexagonally shaped knob 43 for enhancing the user's grip when tightening or loosening the clamp 16.

In exemplary embodiments, the tool holder 10 may be used, for example, to firmly hold virtually any tool, including a paint brush, roller frame, trim roller, scraper, sander, duster, and/or flashlight, as long as the diameter of the tool handle does not exceed a maximum size of the openings 29, 30, for example, 1% inches. However, it should be readily apparent that the size of the supports 26, 28 and associate openings 29, 30; the angular orientation of the angled sides of the inwardly facing wall surfaces 32, 33 of the supports; and/or inverse shape of the arm sections of the clamp 16; etc. may be increased or decreased for accommodating larger or smaller size tool handles as desired.

As shown, the locking coupling 18 is interposed between the holder handle 12 and the cage assembly 14 for operatively coupling these members together and for selectively adjusting the angular orientation of the cage assembly 14 relative to the holder handle 12 to a wide range of angles to permit the tools firmly held thereby to reach different angles. The threaded actuator 20 is provided to interact with the locking coupling 18 for permitting such angular adjustment when the coupling 18 is in a release or unlocked state, or for restricting such angular adjustment when the coupling 18 is in a locked state.

In exemplary embodiments, the locking coupling 18 includes opposing locking couplers 50, 52 that interlockingly engage with each other to provide the locked state, and which releasably disengage from each other to provide the released state. As shown, the cage assembly 14 is operably connected to a body portion 54 of the first one of the couplers 50, and the holder handle 12 is operably connected to a body portion 56 of the second one of the couplers 52. As shown, the first coupler 50 (also referred to as the cage-side coupler 50) may be integral and unitary with the cage assembly 14, such as via the body portion 54. Alternatively or additionally, the second coupler 52 (also referred to as the handle-side coupler 52) may be integral and unitary with the holder handle 12, such as via body portion 56.

In the illustrated embodiment, the locking couplers 50, 52 respectively include first and second facing gears 58, 60 that are operably coupled to the respective body portions 54, 56 of the couplers 50, 52. As shown, the facing gears 58, 60 each have a plurality of circumferentially spaced apart teeth 62, 64 that protrude from respective end faces 63, 65 of the gears 58, 60. The opposing teeth 62, 64 of the respective facing gears 58, 60 are movable into and out of engagement with one another and are selectively indexable relative to one another when disengaged for adjusting the angular orientation of the cage assembly 14 relative to the holder handle 12. In exemplary embodiments, the respective teeth 62, 64 may have a squared profile, as shown, to help guide the axial and indexing movement of the respective facing gears 58, 60 relative to each other. As shown, the facing gears 58, 60 may be integral and unitary with the respective body portions 54, 56 of the couplers 50, 52. In the illustrated embodiment, the body portion 54 axis is substantially orthogonal to the screw 42 axis, whereas the holder handle 12 axis is substantially orthogonal to the body portion 54 axis. Also as shown in the illustrated embodiment, the end face 63 of the gear 58 operably coupled to the body portion 54 is in a plane substantially parallel to the holder handle 12 axis, whereas the end face 65 of the gear 60 operably coupled to the body portion 56 is in a plane substantially orthogonal to the body portion 56 axis.

Figure 3:
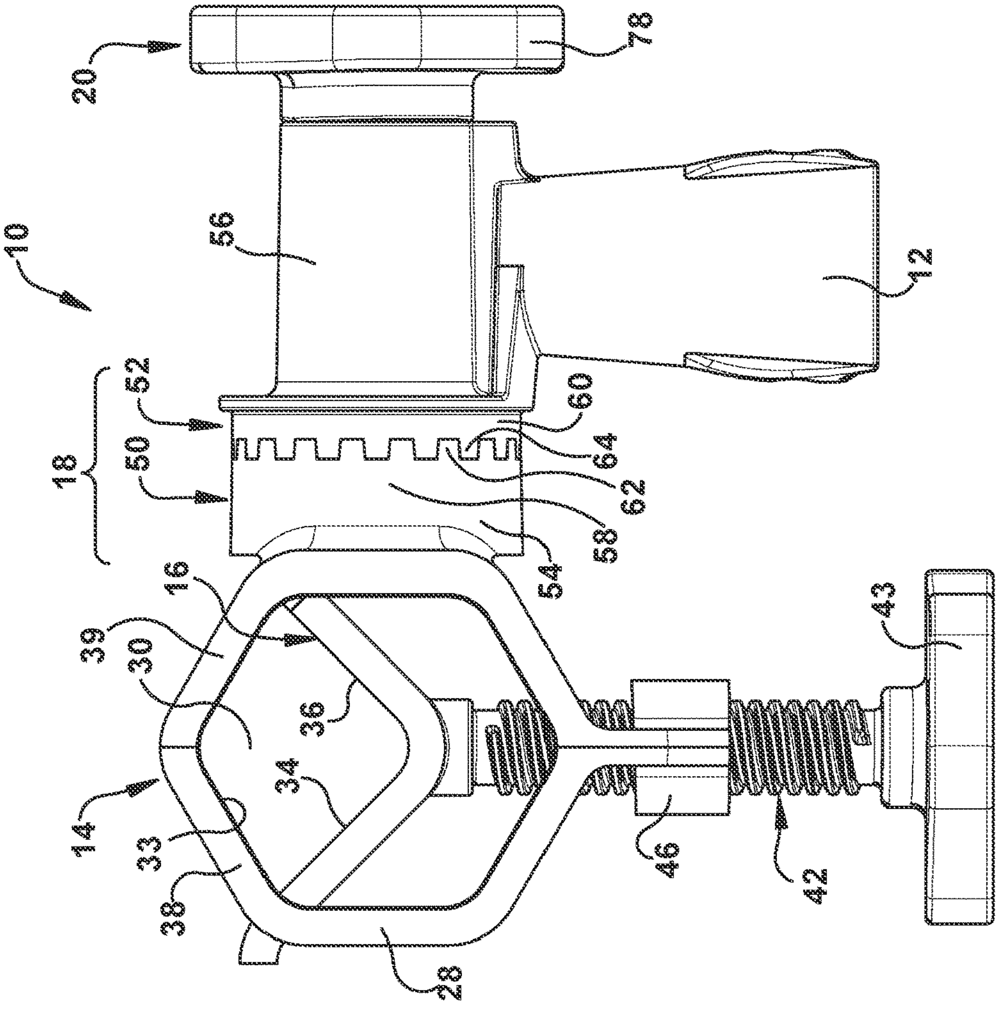
FIG. 3 is a front view of the tool holder.
Figure 7:
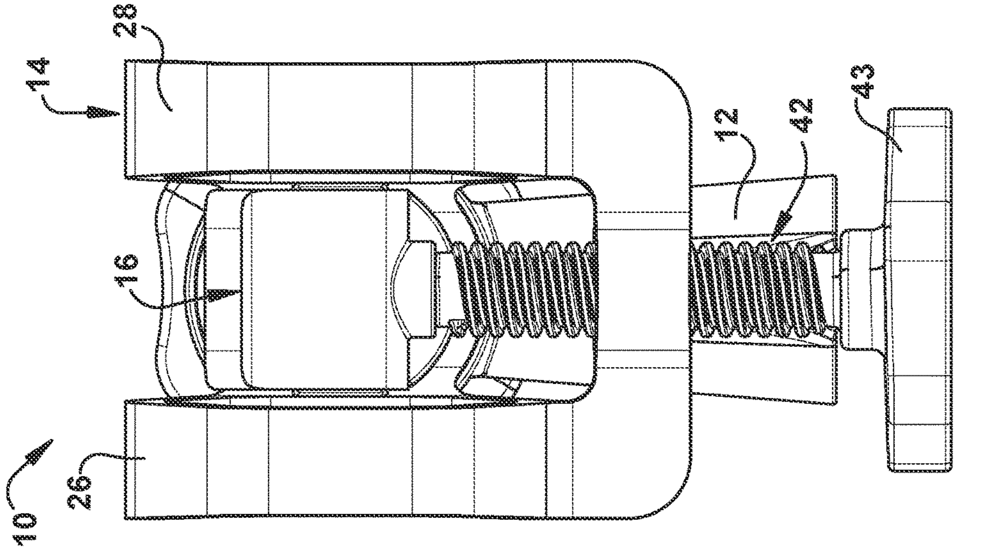
FIG. 7 is a right side view of the tool holder.
Figure 5:
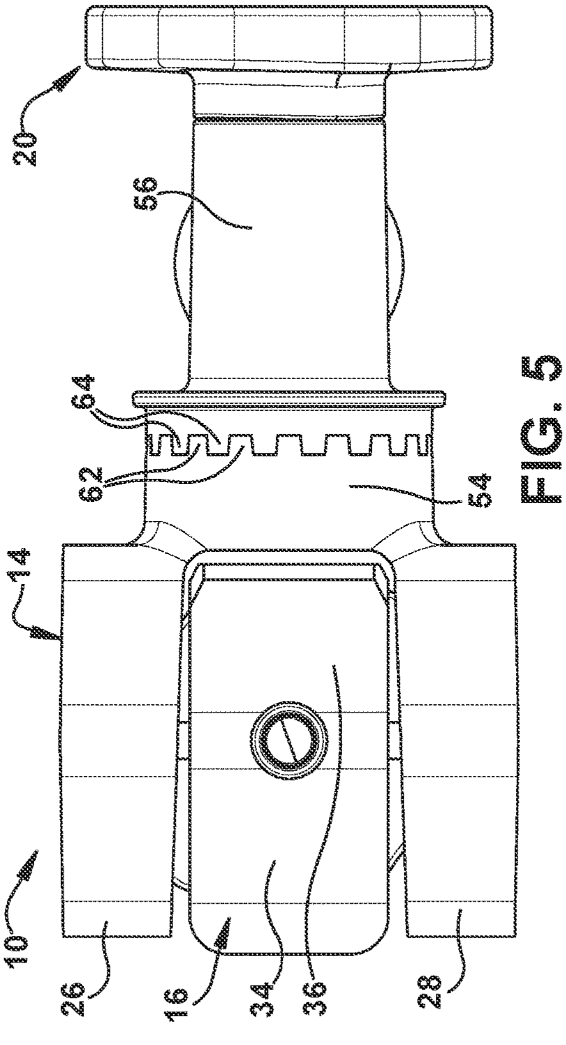
FIG. 5 is a top view of the tool holder.
Figure 6:
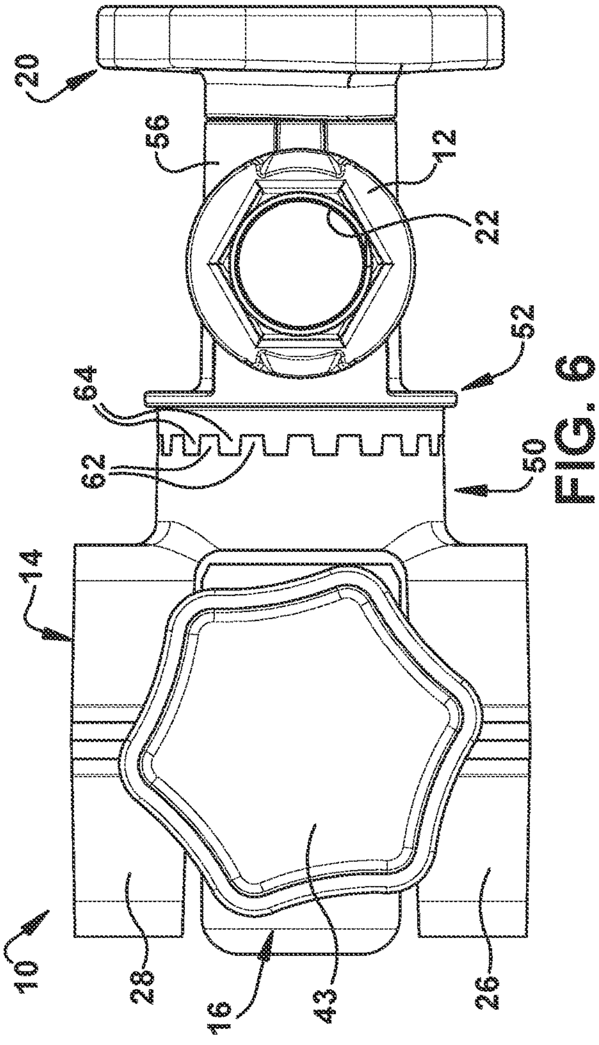
FIG. 6 is a bottom view of the tool holder.
Figure 8:
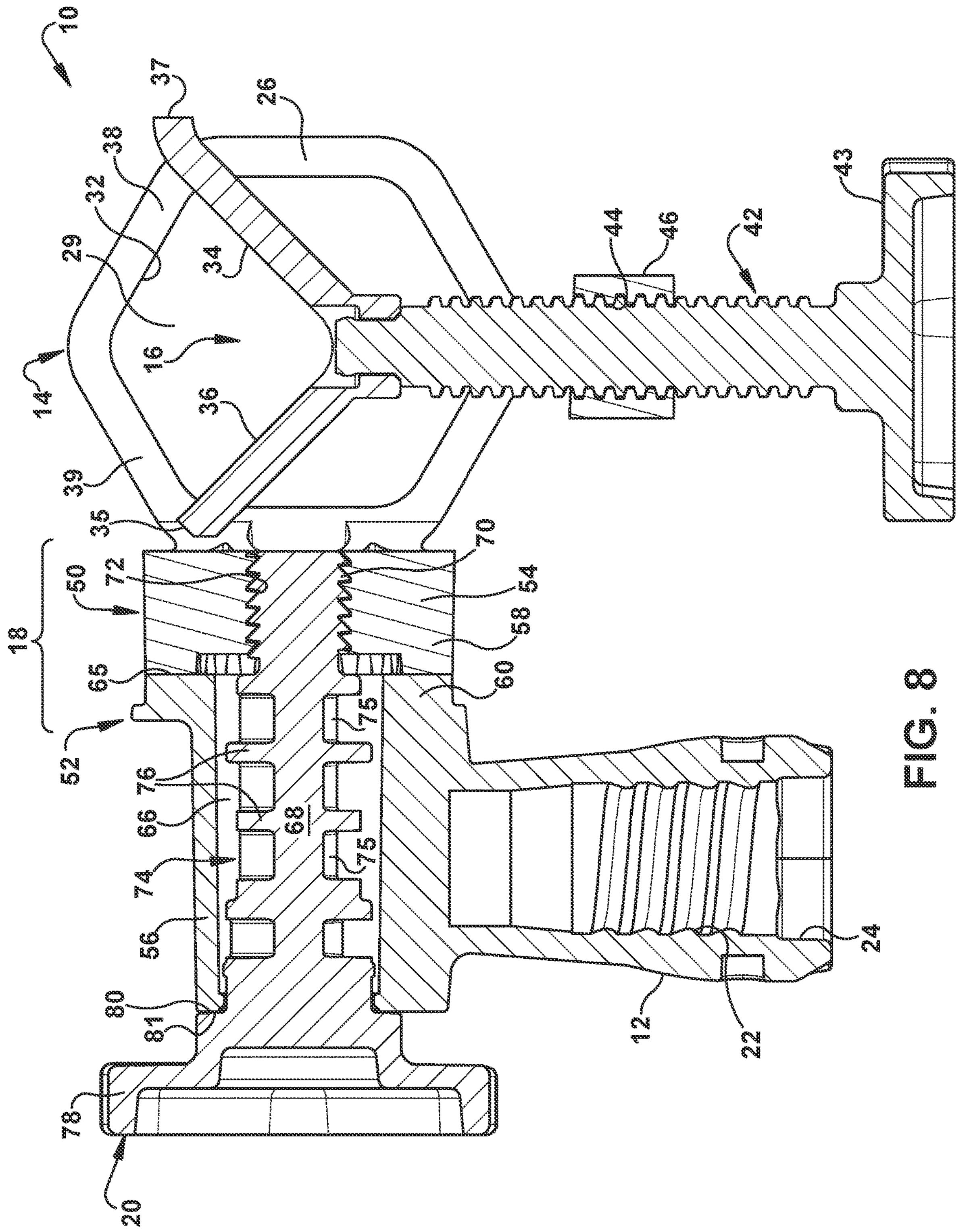
FIG. 8 is a cross-sectional view of the tool holder taken about the line A-A in FIG. 4, with an exemplary locking coupling of the tool holder shown in an exemplary locked state.
Figure 9:
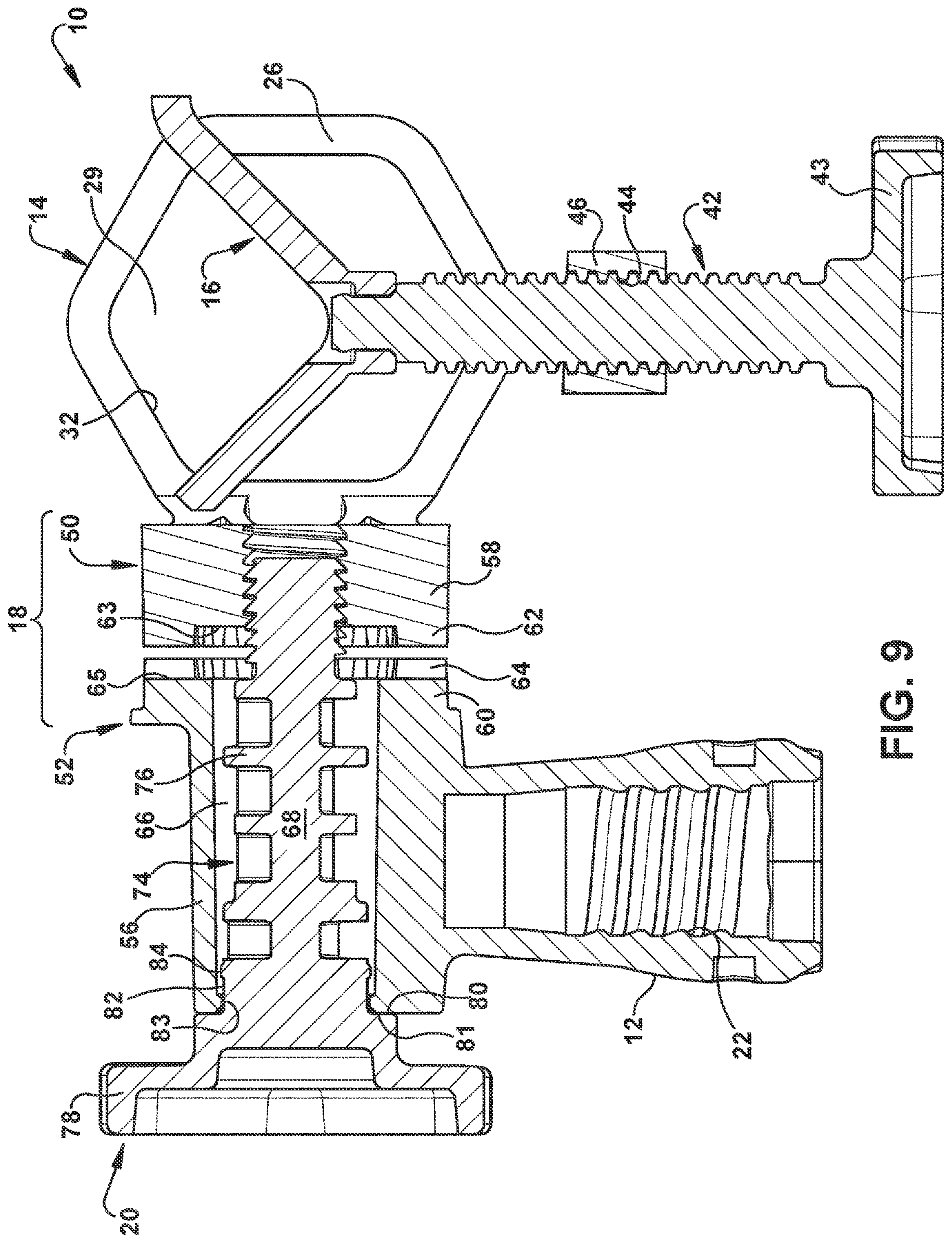
FIG. 9 is a cross-sectional view of the tool holder taken about the line A-A in FIG. 4, with the exemplary locking coupling of the tool holder shown in an exemplary unlocked state.

The threaded actuator 20 is threadably movable relative to the locking coupling 18 between a lock position (as shown in FIGS. 3 and 8, for example), in which the actuator 20 interacts with the locking coupling 18 to restrict adjustment of the angular orientation of the cage assembly 14 relative to the holder handle 12, and a release position (as shown in FIG. 9, for example), in which the threaded actuator 20 interacts with the locking coupling 18 to permit adjustment of the angular orientation. As shown in the illustrated embodiment, for example, the threaded actuator 20 extends through a passage 66 (or barrel 66) in the body portion 56 of the handle-side coupler 52 to threadably engage with the cage-side coupler 50. As shown, the actuator 20 may include a stem portion 68 having outward threads 70 at an end portion thereof, and the body portion 54 of the cage-side coupler 50 may include a bore with inward threads 72 for threadably engaging the threaded end of the actuator stem 68. In exemplary embodiments, the respective threads 70, 72 may be configured as buttress threads to enhance the strength thereof. As shown, an intermediate portion 74 of the stem 68 may include circumferential notches 75 and corresponding ribs 76, which may help to reduce the weight of the actuator 20 while also maintaining strength. The notches 75 and ribs 76 also may facilitate part moldability/manufacturability. The threaded actuator 20 also may include an external knob 78 at an end portion thereof that facilitates the ability of a user to rotate the actuator 20 and thereby threadably move the actuator 20 relative to the cage-side coupler 50 between the lock and release positions. As shown, the knob 78 may have a hexagonal profile for enhancing the grip of the user.

Referring particularly to FIG. 8, the exemplary locked state of the locking coupling 18 is shown, in which the respective teeth 62, 64 of the facing gears 58, 60 are interlocking engaged with each other to restrict angular movement of the locking couplers 50, 52, and thereby the cage assembly 14 and holder handle 12, relative to each other. As shown, the threaded actuator 20 may include an abutment surface 80 at the intermediate portion 74 or end portion of the stem 68 that is configured to engage a corresponding engagement surface 81 of the handle-side coupler 52. When the actuator 20 is threadably advanced relative to the cage-side coupler 50 via the threads 70, 72, the abutment surface 80 of the actuator 20 engages the engagement surface 81 and urges the handle-side coupler 52 into interlocking engagement with the cage-side coupler 50 via the teeth 62, 64. The opposing end faces 63, 65 of the respective couplers 50, 52 serve as stops to the axial motion of the couplers 50, 52 relative to each other. Alternatively or additionally, the end of the threaded bore 72 may serve as a stop to the axial movement of the actuator 20. In the illustrated embodiment, the abutment surface 80 of the actuator 20 is configured as a shoulder that is axially forward the knob 78, and the engagement surface 81 of the coupler 52 is an axial end surface of the coupler 52. It is understood, however, that other suitable forms of abutment and engagement surfaces 80, 81 may be utilized, which may take different forms and/or be positioned at different locations, as would be understood by those having ordinary skill in the art.

Referring particular to FIG. 9, the exemplary release (or unlocked) state of the locking coupling 18 is shown, in which the respective teeth 62, 64 of the facing gears 63, 65 are disengaged from each other, and are rotationally adjustable relative to each other, to adjust the angular orientation of the cage assembly 14 relative to the holder handle 12. As shown in the illustrated state, when the actuator 20 is threadably withdrawn from the cage-side coupler 50 via the threads 70, 72, the abutment surface 80 of the actuator 20 releasably disengages from the engagement surface 81 of the handle-side coupler 52 to provide spacing that allows the respective couplers 50, 52 to be axially moved away from each other for the releasable disengagement of the locking coupling 18. As shown, the actuator 20 may include a circumferential groove 82 at the intermediate portion 74 or end portion, and the handle-side coupler 52 may include a protrusion 83 that is axially slidable along a length of the groove 82. The axial length of the groove 82 should be at least as long as the axial length of the respective teeth 62, 64 to thereby permit the teeth to clear each other when the handle-side coupler 52 is slid backward along the groove 82 of the actuator 20. The depth of the groove 82 and the radial size of the protrusion 83 may be closely toleranced to minimize the amount of play between the actuator 20 and coupler 52. Other portions of the coupler 52, such as radially outwardly extending ribs 76, also may help to minimize such play. In the illustrated embodiment, the groove 82 in the actuator 20 is formed between the shoulder forming the abutment surface 80 and a radially outwardly extending protrusion 84; and the protrusion 83 of the handle-side coupler 52 is a radially inwardly extending protrusion 83 at the end portion of the handle-side coupler 52. It is understood, however, that such structures may take different forms and/or be posited at different locations to accommodate the same or similar functionality, as would be understood by those having ordinary skill in the art.

As exemplified in the figures, it is apparent that after the user has deactivated the locking coupling 18 to achieve the release state, and has turned/indexed the angular position of the holder handle 12 relative to the cage assembly 14, then the user may actuate the threaded actuator 20 to again lock the locking coupling 18. The indexable adjustment may be discrete steps that are determined by the circumferential spacing of the teeth 62, 64. For example, the tool holder 10 may provide a minimum angular adjustment of about 10° to about 25°, and more particularly about 15° (e.g., a single tooth spacing), while the maximum angular adjustment may be up to or greater than 360°. In some embodiments, the maximum angular adjustment may be limited to a predefined amount, such as by utilizing suitable stops on the locking couplers 50, 52. For example, the range of angular adjustment may be limited to 90°, 180°, 270°, or any desired value between 0° to 360°.

The exemplary tool holder 10 provides one or more advantages over conventional tool holders. For example, some convention tool holders may utilize more complex means for locking or releasing the angular adjustment of the handle portion relative to the clamp/holder portion. For example, in such conventional designs a cam assembly may be utilized that includes numerous parts, such as a cam lever, spring, carriage bolt, center slide, roll pin, numerous nuts, and the like. Such operation of the cam assembly may be difficult for the user to operate. In addition, some of these numerous parts may be made from different materials via different processes, and/or may be more difficult to manufacture or assemble. In contrast with such conventional designs, the interaction of the exemplary threaded actuator

20 with the exemplary locking coupling 18 provides a much simpler ease of use to adjust the angular orientation of the cage assembly 14 relative to the holder handle 12. The relatively simple construction of the exemplary tool holder 10 also may minimize the number of components needed for such as design, thereby reducing manufacturing costs. For example, in the illustrated embodiment, the exemplary tool holder 10 includes only five parts. In addition, each of these parts may be made from the same material and/or the same process, such as injection molding plastic.

To facilitate assembly of the tool holder 10 with such few parts, resilient snap-fit connection(s) may be utilized to couple one or more of the parts together. For example, the threaded actuator 20 may be inserted and secured in the barrel 66 by a resilient snap-fit connection. As shown in the illustrated embodiment, for example, the radially outward protrusion 84 of the actuator 20 has the greatest diameter of the intermediate portion 74, and when inserted into the barrel 66 exerts a force against the radially inward protrusion 83 of the coupler 52, which thereby urges the end portion of the coupler 52 outwardly to allow the protrusions to slide past each other. The barrel 66 may then resiliently snap back into place, thereby securing the actuator 20 by restricting rearward movement beyond the inward protrusion 83. As shown, the respective protrusions 83, 84 may have rounded or tapered surfaces to facilitate such snap-fit connection. It is of course understood that in other embodiments the tool holder 10 may include fewer or greater parts, may be made from different materials and/or different processes, and/or may utilize connections other than snap-fit connections.

Figure 10:
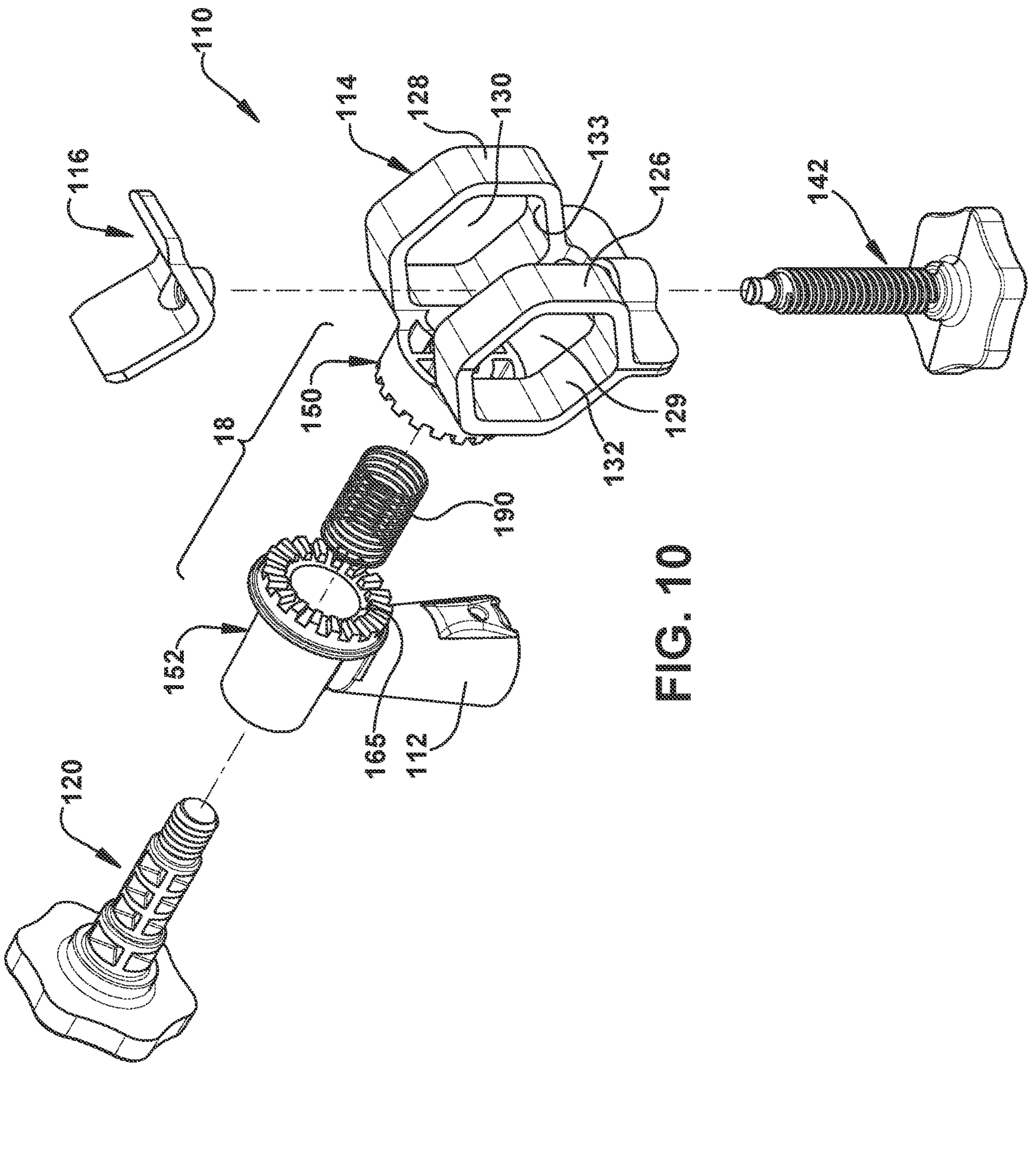
FIG. 10 is an exploded perspective view of another exemplary tool holder according to an embodiment of the present invention.
Figure 11:
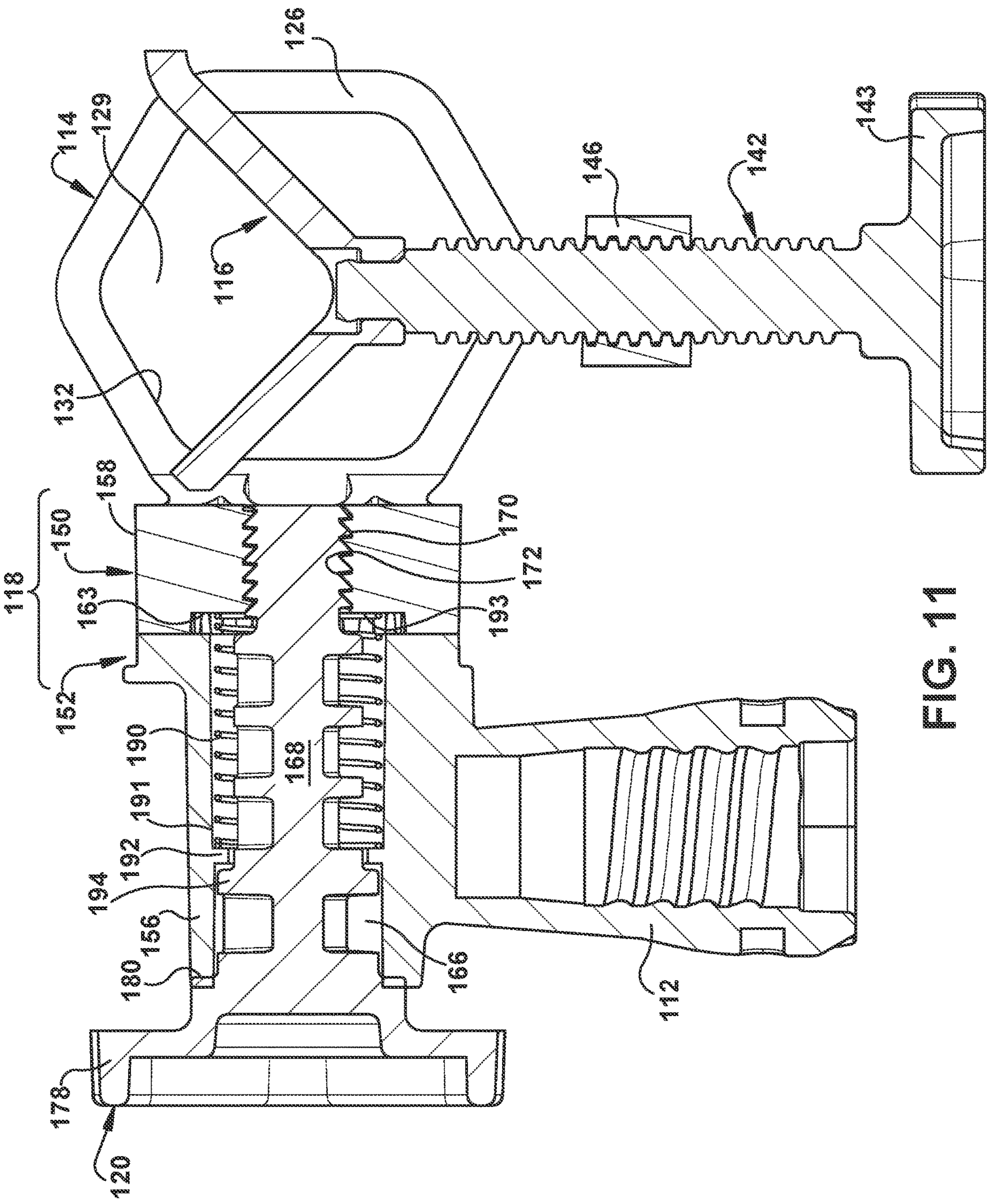
FIG. 11 is a cross-sectional view of the tool holder in FIG. 10, with an exemplary locking coupling of the tool holder shown in an exemplary locked state.
Figure 13:
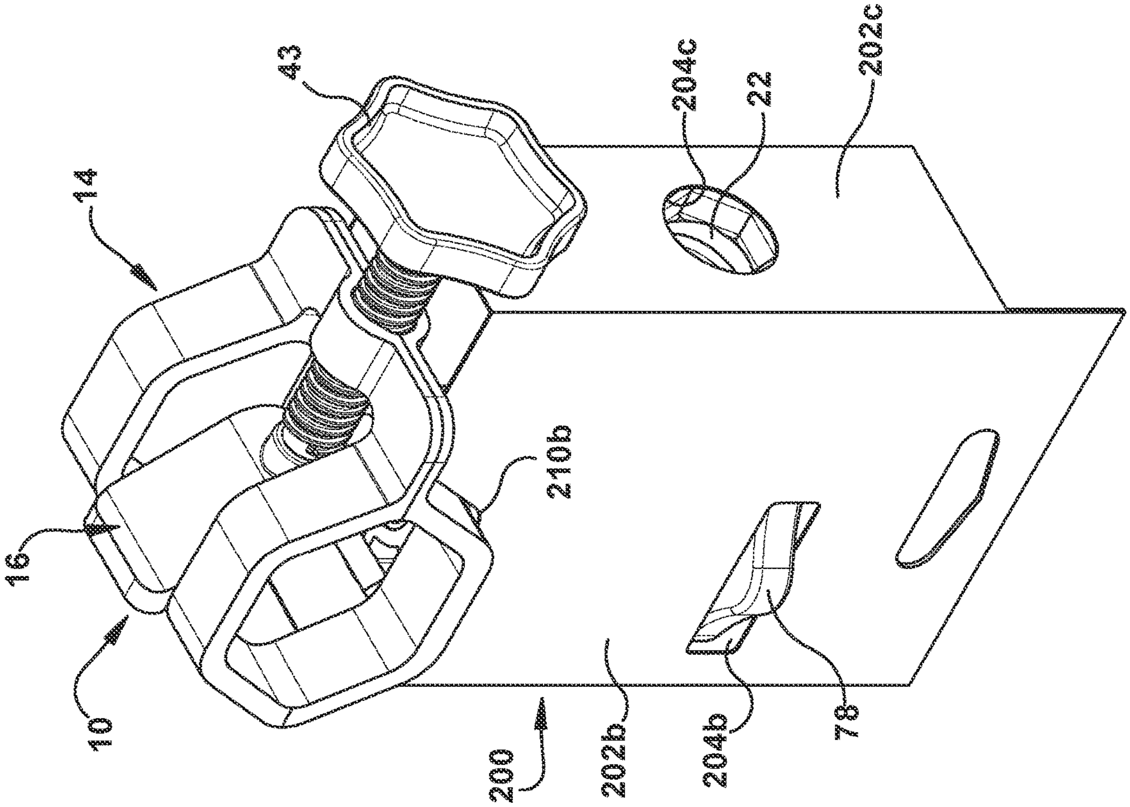
FIG. 13 is a perspective bottom, back view of the packaging.
Figure 12:
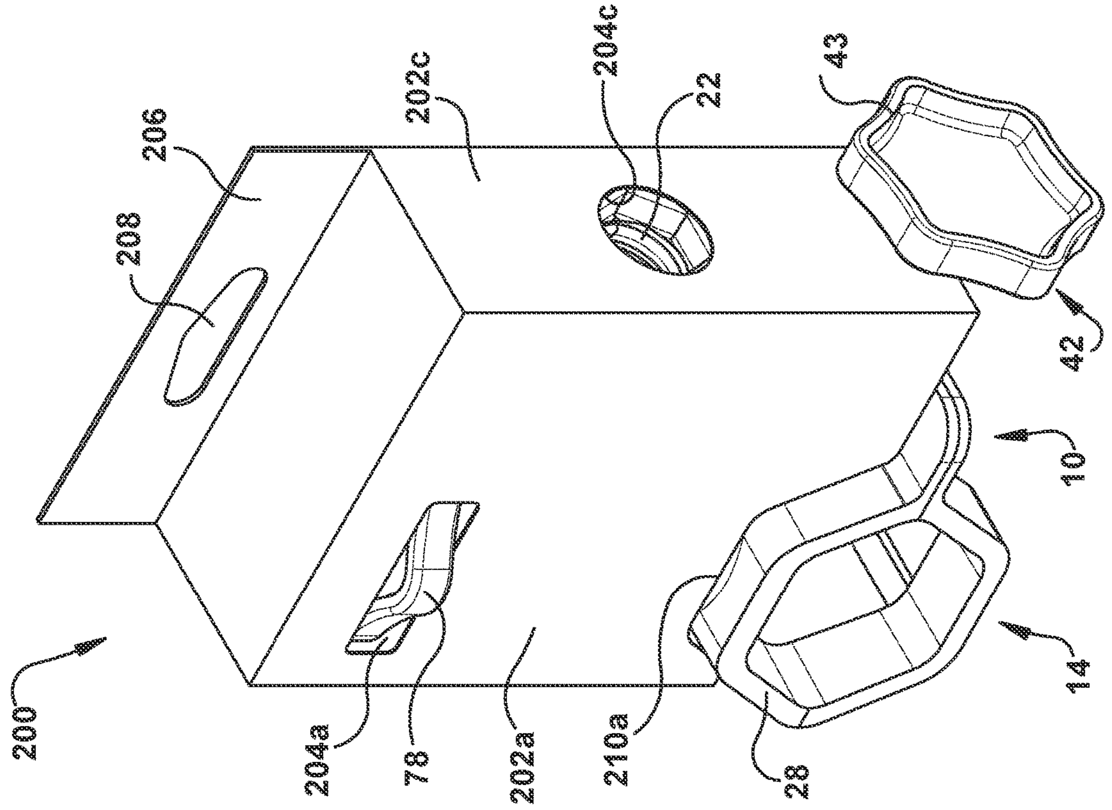
FIG. 12 is a perspective top, front view of exemplary packaging containing the tool holder in FIG. 1.
Figure 15:
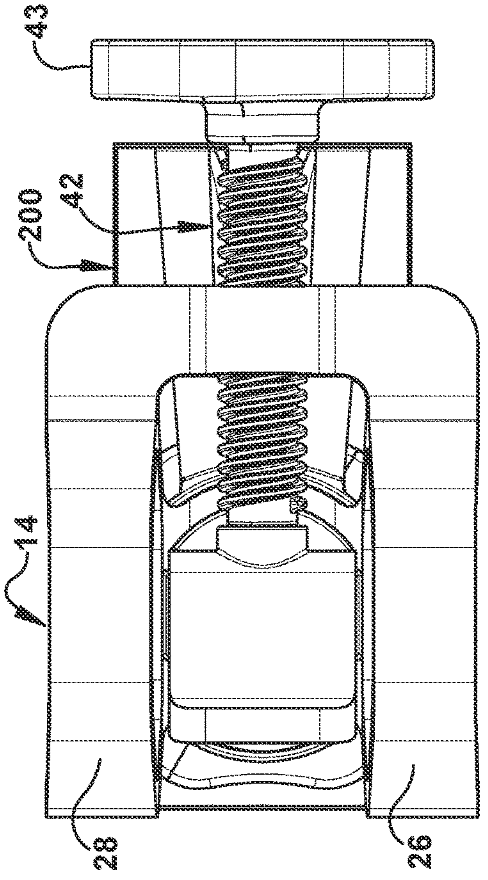
FIG. 15 is a bottom view of the packaging.
Figure 16:
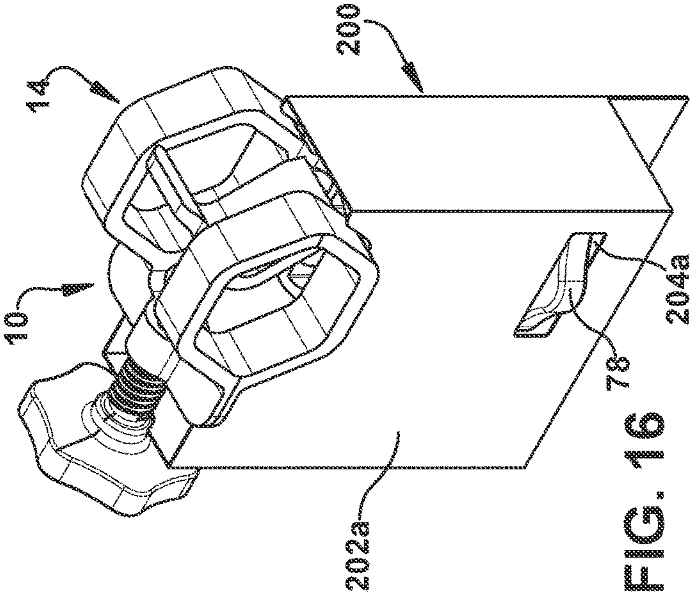
FIG. 16 is a perspective bottom, front view of the packaging.
Figure 14:
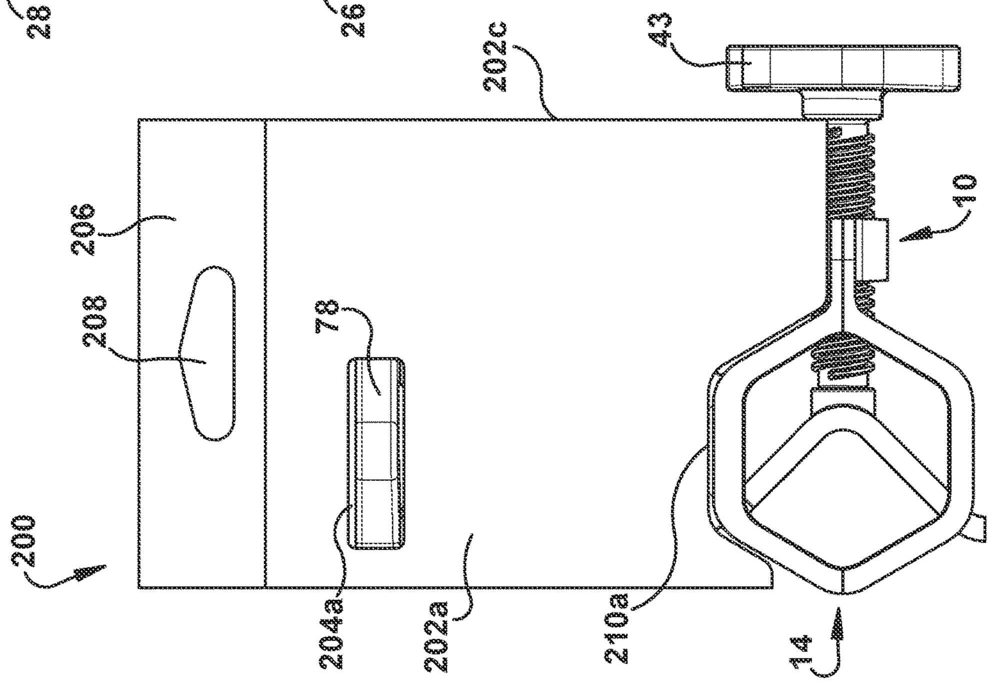
FIG. 14 is a front view of the packaging.

Referring to FIGS. 10 and 11, another exemplary embodiment of a tool holder 110 is shown. The tool holder 110 is substantially the same as the above-referenced tool holder 10, and consequently the same reference numerals but indexed by 100 are used to denote structures corresponding to similar structures in the tool holders 10, 110. In addition, the foregoing description of the tool holder 10 is equally applicable to the tool holder 110, except as noted below. Moreover, aspects of the tool holders 10, 110 may be substituted for one another or used in conjunction with one another where applicable.

As shown, similarly to the tool holder 10, the tool holder 110 includes a holder handle 112 for coupling to an extension pole, and a cage assembly 114 that cooperates with a clamp 116 for firmly holding different tools having a wide range of tool handle sizes and shapes. A locking coupling 118 is provided, including locking couplers 150, 152, for enabling the cage assembly 114 to be indexable relative to the holder handle 112 to a wide range of angles to permit tools firmly held thereby to reach different angles at various heights. In addition, a threaded actuator 120 is provided that is operable to lock or unlock the locking coupling for permitting or restricting the angular adjustment of the holder handle 112 and cage assembly 114 relative to each other.

The tool holder 110 and the operation thereof is essentially the same as the above-referenced tool holder 10, except that a biasing member 190 is provided between respective portions of the locking couplers 150, 152. The biasing member 190 is configured to bias the locking couplers 150, 152 away from each other toward the unlocked state. This facilitates the engagement or disengagement of the couplers 150, 152 from each other when the threaded actuator 120 is actuated by the user, which thereby also facilitates the indexable angular adjustment of the holder handle 112 relative to the cage assembly 114.

In the illustrated embodiment of FIGS. 10 and 11, the tool holder 110 is shown with the locking coupler 150, 152 in an exemplary locked state, similarly to that shown in FIG. 8 of the tool holder 10. In exemplary embodiments, the biasing member 190 is a coil spring that is predominantly disposed in passage 166 (or barrel 166) in body portion 156 of the handle-side locking coupler 152. As shown, one end 191 of the biasing member 190 engages a radially inward shoulder 192 of the handle-side coupler 150, and the opposite end 193 of the biasing member engages a radially inward portion of end face 163 of cage-side coupler 150. The biasing member 190 exerts a biasing force via the shoulder 192 to corresponding portion(s) of the threaded actuator 120. For example, the biasing force may be exerted via the shoulder 192 to a radially outward shoulder portion 194 of the stem 168 of the actuator 120; and/or may be exerted against the abutment surface 180 of the actuator 120. In this manner, when the threaded actuator 120 is threadably withdrawn from the cage-side coupler 150 via threads 170, 172, the biasing force of the biasing member 190 causes the handle-side coupler 152 to follow the axial movement of the actuator 120 away from the cage-side coupler 150 to the unlocked state (not shown), which is similarly to that shown in FIG. 9 the tool holder 10. Likewise, because the handle-side coupler 152 is urged against the actuator 120 via the biasing member 190, the handle-side coupler 152 follows the axial movement of the actuator 120 toward the cage-side coupler 150 when the actuator 120 is threadably actuated to again lock the locking coupling 118.

Referring to FIGS. 12-17, exemplary packaging 200 for displaying the exemplary tool holder 10 or 110 is shown. Generally, the display packaging 200 includes sidewalls 202 that enclose a space for containing at least a portion of the tool holder, in which the sidewalls 202 include one or more openings 204 for one or more portions of the tool holder 10 to extend therethrough.

The packaging 200 may include at least one of front, back, left, right, top and bottom sidewalls 202 to form at least a portion of a box that encloses the space containing a portion of the tool holder 10. In the illustrated embodiment, the packaging 200 includes all but a bottom sidewall to form the enclosed space on all sides except for the bottom side, and except for the openings 204 that are utilized to display portions of the tool holder. The packaging 200 also may include a tab portion 206 with a hole 208 for hanging the combined packaging 200 and tool holder 10 on a display rack.

As shown in the illustrated embodiment, the packaging 200 includes three openings 204*a*, 204*b*, 204*c* (collectively referred to as openings 204) in respective sidewalls 202*a*, 202*b*, 202*c* (collectively referred to as sidewalls 202) for displaying portions of the tool holder. Each of these openings 204 is bounded by portions of the respective sidewall 202 on which the opening is located. The first and second openings 204*a*, 204*b* are located on opposite front and back sidewalls 202*a*, 202*b*, and are aligned with each other. As shown, the packaging 200 is configured such that portions of the knob 78 of the actuator 20 extends through these first and second openings 204*a*, 204*b*. This allows a potential buyer to feel and at least partially test the actuation of the actuator 20. The third opening 204*c* is located on the right sidewall 202*c* and is configured to display the socket 22 or recess 24 in the holder handle 12.

In the illustrated embodiment, the packaging 200 does not contain a bottom sidewall and is open to allow the cage assembly 14 to extend therethrough. As shown, the front and back sidewalls 202*a*, 202*b* include respective cutout portions 210*a*, 210*b* that are aligned with each other and are configured in the partial shape of a hexagon perimeter for corresponding with the hexagonally-shaped supports 26, 28. The clamp 16 including screw 42 also are located mostly externally of the packaging 200, with a small semi-circular cutout 210*c* at the bottom of the right sidewall 202*c* that is configured to receive the threaded portion of the screw 42. Such a configuration allows a potential buyer to view the cage assembly 14 and clamp 16, and at least partially test the operation of the clamp 16 via the knob 43. In addition, the open bottom of the packaging 200 enables a potential buyer to better see the overall mechanics, materials and/or size of the tool holder 10, particularly when the sidewalls 202 are made from opaque material. Because the bottom of the packaging 200 is open in the illustrated embodiment, the portions of the sidewalls 202*a*, 202*b* defining the openings 204*a*, 204*b* also may support the tool holder 10 in the packaging 200 via the outwardly extending portions of the knob 78.

Figure 17:
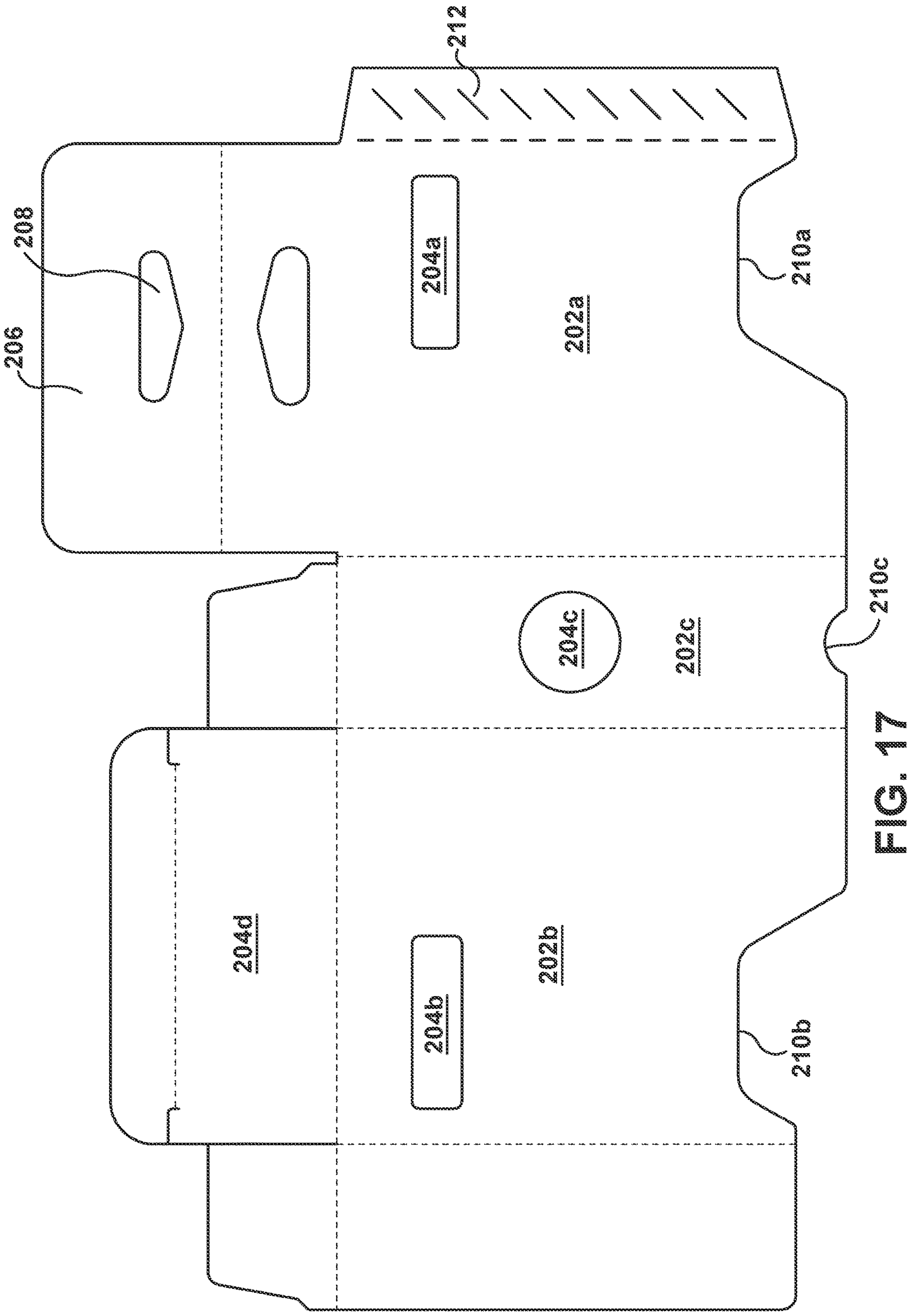
FIG. 17 is plan view of an exemplary die-cut folding layout of the packaging in FIG. 1.

Referring to FIG. 17, an exemplary die-cut and fold-line layout of the packaging 200 is shown. As shown, the packaging 200 may be formed from a single piece of material, such as cardboard (e.g., single-walled). The packaging material may be die-cut to form the respective openings 204 and cutout portions 210. A creaser may be used to form the fold lines (shown in broken line). At least one edge may have adhesive 212, such as a glue strip, for adhering another portion of the packaging 200 and forming the box with the enclosed space. As shown, a lid portion forming a top sidewall 204*d* may be provided. Such packaging 200 may be easier to open compared to conventional blister packs. In addition, such packaging 200 may enable a security RFID tag to be hidden within the enclosed space.

It is understood that fewer or greater sidewalls 200, openings 204 and/or cutouts 210 may be provided in the packaging 200 as may be desired to display the tool holder 10. For example, the bottom of the packaging 200 could be enclosed with a sidewall and have an opening to enable portions of the tool holder 10 to extend therethrough. It is also understood that such openings 204 and/or cutouts 210 may have different shapes and/or be located at different locations depending on the particular configuration of the tool holder 10. It is furthermore understood that terms such as “top,” “bottom,” “front,” “back,” “left,” “right,” and the like as used herein should be understood as referring to an arbitrary frame of reference, rather than to the ordinary gravitational frame of reference.

Exemplary tool holders 10, 110 have been described herein that are adapted for firmly holding a wide range of sizes and shapes of tool handles. The exemplary tool holder 10, 110 includes a holder handle 12, a cage assembly 14, a clamp 16, a locking coupling 18, and a threaded actuator 20. The cage assembly 14 includes a pair of axially spaced apart supports 26, 28 having axially aligned through openings 29, 30 sized for receiving tool handles of different sizes and shapes. The clamp 16 is transversely movable between the supports 26, 28 in opposite directions for releasably clamping the tool handle against the supports 26, 28. The locking coupling 18 is interposed between the holder handle 12 and the cage assembly 14 for selectively adjusting the angular orientation of the cage assembly 14 relative to the holder handle 12. The threaded actuator 20 is operable to activate or deactivate the locking coupling 18 for permitting or restricting adjustment of the angular orientation of the cage assembly 14 relative to the holder handle 12. The exemplary tool holder facilitates the ease of use and/or has a simpler construction than other conventional tool holder designs.

An exemplary display packaging 200, separately or in combination with the tool holder 10 or 110, also has been described herein. The product packaging 200 protects and holds the tool holder 10, 110 while also permitting a potential buyer to feel and/or at least partially test portions of the tool holder. The product packaging 200 could also be used for conventional tool holder designs. The product packaging 200 may be easier to open than conventional blister packs, and also may enable RFID security tags to be hidden therein. A kit including at least the tool holder 10 or 110 and packaging 200 also may be provided.

According to an aspect of the invention, a tool holder for firmly holding a wide range of sizes and shapes of tool handles, includes: a holder handle; a cage assembly, the cage assembly comprising a pair of axially spaced apart supports having axially aligned through openings formed by respective inwardly facing surfaces of the supports, in which the openings are sized for receiving tool handles of different sizes and shapes through both of the aligned openings; a clamp transversely movable between the supports in opposite directions toward and away from the respective inwardly facing surfaces of the supports for releasably clamping the tool handle against the inwardly facing surfaces; a locking coupling interposed between the holder handle and the cage assembly for selectively adjusting the angular orientation of the cage assembly relative to the holder handle; and a threaded actuator that is operable to interact with the locking coupling for permitting or restricting adjustment of the angular orientation of the cage assembly relative to the holder handle.

Embodiments of the invention may include one or more of the following additional features, separately or in any combination.

In some embodiments, the threaded actuator is threadably movable relative to the locking coupling between a lock position and a release position.

In some embodiments, where in the lock position the threaded actuator causes the locking coupling to be in a locked state that restricts adjustment of the angular orientation of the cage assembly relative to the holder handle.

In some embodiments, in the release position the threaded actuator causes the locking coupling to be in an unlocked state that permits adjustment of the angular orientation of the cage assembly relative to the holder handle.

In some embodiments, the locking coupling includes a first locking coupler operably coupled to the cage assembly.

In some embodiments, the locking coupling includes a second locking coupler operably coupled to the holder handle.

In some embodiments, where in the lock position the threaded actuator interacts with the locking coupling to cause the first and second locking couplers to lock together such that relative rotational movement of the locking couplers is restricted to thereby restrict adjustment of the angular orientation of the cage assembly relative to the holder handle.

In some embodiments, where in the release position the threaded actuator interacts with the locking coupling to cause the first and second couplers to unlock from each other such that relative rotational movement of the locking couplers is permitted to thereby permit adjustment of the angular orientation of the cage assembly relative to the holder handle.

In some embodiments, where in the locked state, the first and second locking couplers are interlockingly engaged with each other.

In some embodiments, where in the unlocked state, the first and second locking couplers are movable out of engagement with one another and indexable relative to one another for adjusting the angular orientation of the cage assembly relative to the holder handle.

In some embodiments, the first locking coupler includes a first facing gear having a first end face with a plurality of circumferentially spaced apart first teeth extending from the first end face.

In some embodiments, the second locking coupler includes a second facing gear having a second end face with a plurality of circumferentially spaced apart second teeth extending from the second end face, the first and second end faces opposing each other.

In some embodiments, where in the locked state, the respective first and second teeth interlockingly engage each other to restrict rotation of the first facing gear relative to the second facing gear.

In some embodiments, where in the unlocked state, the respective first and second teeth are moveable out of engagement with one another to permit rotation of the first facing gear relative to second facing gear.

In some embodiments, the threaded actuator has a threaded portion that threadably interacts with a threaded portion of the first locking coupler to cause the actuator to move between the lock and release positions.

In some embodiments, the threaded portion of the threaded actuator includes radially outward threads at an end portion of a stem.

In some embodiments, the threaded portion of the first locking coupler includes radially inward threads at an internal bore in a body portion of the first locking coupler.

In some embodiments, the threads of the actuator and threads of the first locking coupler are buttress threads.

In some embodiments, the stem portion of the threaded actuator extends through a passage in a body portion of the second locking coupler to be threadably received in the internal bore of the first locking coupler.

In some embodiments, the threaded actuator includes an abutment surface that is configured to engage an engagement surface of a body portion of the second locking coupler to thereby urge the second locking coupler into locking engagement with the first locking coupler when the actuator is in the locked position.

In some embodiments, when the actuator is in the release position, spacing is provided between the abutment surface and the engagement surface to thereby allow the second locking coupler to move axially away from the second locking coupler to the unlocked state for adjusting the angular orientation of the cage assembly relative to the holder handle.

In some embodiments, the abutment surface is formed from a shoulder portion of the threaded actuator.

In some embodiments, the engagement surface is formed from an axial end portion of the second locking coupler.

In some embodiments, the threaded actuator includes a radially outward circumferential groove, and the second locking coupler includes a radially inwardly extending protrusion that is configured to move along a length of the groove when the actuator is moved between the lock and release positions.

In some embodiments, one end of the groove is formed by a radially outwardly extending protrusion on the threaded actuator.

In some embodiments, engagement of the radially inwardly extending protrusion of the second locking coupler and the radially outwardly extending protrusion of the actuator serves as stop to restrict removal of the threaded actuator from the second locking coupler.

In some embodiments, the threaded actuator is movably secured in a barrel of the second locking coupler by a resilient snap-fit connection.

In some embodiments, the through-openings in the supports are hexagonal shaped.

In some embodiments, the threaded actuator includes an external hexagonally shaped knob configured for operation by a hand of a user.

In some embodiments, the clamp includes a screw operably coupled to the clamp for transverse movement in opposite directions between the supports.

In some embodiments, the supports are joined together by a cross member.

In some embodiments, the screw is threadedly received in a threaded bore in the cross member.

In some embodiments, the screw and the threaded bore having double-lead Acme threads.

In some embodiments, the screw includes a hexagonally shaped knob configured for operation by a hand of a user.

In some embodiments, the tool holder consists of only five parts.

In some embodiments, all parts of the tool holder are made from injection molded plastic.

In some embodiments, the tool holder further includes a biasing member, the biasing member being configured to bias the first and second locking couplings toward the unlocked state.

In some embodiments, the parts of the tool holder may be made of any suitable material, which may be the same material or different material for one or more of the parts.

In some embodiments, the biasing member (e.g., spring) may be made of metal, plastic (e.g., injection molded), or any other suitable material.

According to another aspect of the invention, a tool holder for firmly holding a wide range of sizes and shapes of tool handles, the tool holder including: a holder handle; a cage assembly, the cage assembly comprising a pair of axially spaced apart supports having axially aligned through openings formed by respective inwardly facing surfaces of the supports, in which the openings are sized for receiving axially extending tool handles of different sizes and shapes through both of the aligned openings; a clamp transversely movable between the supports in opposite directions toward and away from the respective inwardly facing surfaces of the supports to form an enclosed closed space for releasably clamping the tool handle against the inwardly facing surfaces; a pair of locking facing gears interposed between the holder handle and the cage assembly, the locking facing gears having respective teeth that are movable into and out of engagement with one another and indexable relative to one another when disengaged for adjusting the angular orientation of the cage assembly relative to the holder handle; and a threaded actuator that is operable to interact with at least one of the facing gears for permitting or restricting adjustment of the angular orientation of the cage assembly relative to the holder handle, the threaded actuator being threadably movable between a lock position, in which the respective teeth of the facing gears interlockingly engage with each other to restrict adjustment of the angular orientation, and a release position, in which the respective teeth of the facing gears releasably disengage from each other to permit adjustment of the angular orientation.

According to another aspect of the invention, a display packaging is provided in combination with the tool holder according to any of the foregoing, wherein the display packaging at least partially encloses a portion of the tool holder.

Embodiments may include one or more of the following additional features, alone or in any combination.

In some embodiments, the display packaging having one or more openings, in which one or more portions of the tool holder extend therethrough.

In some embodiments, the display package having a first opening in which a portion of a knob of the threaded actuator extends therethrough, the first opening being bounded by a sidewall that supports the tool holder in the packaging.

In some embodiments, a bottom of the package is open, and in which the cage assembly extends through the open bottom.

In some embodiments, respective bottom portions of a front and back sidewall of the packaging each have a cutout portion that matches a shape of the outer surface of the respective supports.

According to another aspect of the invention, a display packaging box includes: sidewalls that enclose a space, the box being configured to at least partially contain a tool holder having: a holder handle; a cage assembly comprising a pair of axially spaced apart supports having axially aligned through openings; and a clamp movable between the supports for releasably clamping the tool handle against the supports.

Embodiments may include one or more of the following additional features, alone or in any combination.

In some embodiments, the box may have an open bottom, and the open bottom of the box may be configured to allow a majority of the cage assembly to be disposed outwardly of the packaging at a bottom of the box.

In some embodiments, the box is configured to at least partially contain a tool holder further having a locking coupling interposed between the holder handle and the cage assembly for selectively adjusting the angular orientation of the cage assembly relative to the holder handle; and an actuator, such as a threaded actuator, that is operable to interact with the locking coupling for permitting or restricting adjustment of the angular orientation of the cage assembly relative to the holder handle; wherein opposing front and back sidewalls of the box include respective openings that are aligned with each other, the respective openings being configured to allow respective portions of the actuator to extend therethrough.

In some embodiments, the display packaging box is provided in combination with the tool holder.

According to another aspect of the invention, a kit includes: the tool holder according to any of the foregoing, and a package that at least partially contains the tool holder.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

The phrase "and/or" as used herein should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tool holder for firmly holding a wide range of sizes and shapes of tool handles, the tool holder comprising:

a holder handle;

a cage assembly comprising a pair of axially spaced apart supports having axially aligned through openings formed by respective inwardly facing surfaces of the supports, wherein the openings are sized for receiving tool handles of different sizes and shapes through both of the aligned openings;

a clamp transversely movable between the supports in opposite directions toward and away from the respective inwardly facing surfaces of the supports for releasably clamping the tool handle against the inwardly facing surfaces;

a locking coupling interposed between the holder handle and the cage assembly for selectively adjusting the angular orientation of the cage assembly relative to the holder handle, wherein the locking coupling includes a first locking coupler operably coupled to the cage assembly, and a second locking coupler operably coupled to the holder handle; and a threaded actuator that is operable to interact with the locking coupling for permitting or restricting adjustment of the angular orientation of the cage assembly relative to the holder handle, wherein the threaded actuator is movably secured in a barrel of the second locking coupler by a resilient snap-fit connection, wherein the threaded actuator is threadably moveable relative to the locking coupling between a lock position and a release position, wherein the lock position of the threaded actuator causes the locking coupling to be in a locked state that restricts adjustment of the angular orientation of the cage assembly relative to the holder handle, and wherein the release position of the threaded actuator causes the locking coupling to be in an unlocked state that permits adjustment of the angular orientation of the cage assembly relative to the holder handle.

2. The tool holder according to claim 1,
where in the lock position the threaded actuator interacts with the locking coupling to cause the first and second locking couplers to lock together such that relative rotational movement of the locking couplers is restricted to thereby restrict adjustment of the angular orientation of the cage assembly relative to the holder handle, and
where in the release position the threaded actuator interacts with the locking coupling to cause the first and second couplers to unlock from each other such that relative rotational movement of the locking couplers is permitted to thereby permit adjustment of the angular orientation of the cage assembly relative to the holder handle.

3. The tool holder according to claim 2,
where in the locked state, the first and second locking couplers are interlockingly engaged with each other; and
where in the unlocked state, the first and second locking couplers are movable out of engagement with one another and indexable relative to one another for adjusting the angular orientation of the cage assembly relative to the holder handle.

4. The tool holder according to claim 3,
wherein the first locking coupler includes a first facing gear having a first end face with a plurality of circumferentially spaced apart first teeth extending from the first end face,
wherein the second locking coupler includes a second facing gear having a second end face with a plurality of circumferentially spaced apart second teeth extending from the second end face, the first and second end faces opposing each other,
where in the locked state, the respective first and second teeth interlockingly engage each other to restrict rotation of the first facing gear relative to the second facing gear; and
where in the unlocked state, the respective first and second teeth are moveable out of engagement with one another to permit rotation of the first facing gear relative to second facing gear.

5. The tool holder according to claim 2, wherein the threaded actuator has a threaded portion that threadably interacts with a threaded portion of the first locking coupler to cause the actuator to move between the lock and release positions.

6. The tool holder according to claim 5, wherein the threaded portion of the threaded actuator includes radially outward threads at an end portion of a stem, and wherein the threaded portion of the first locking coupler includes radially inward threads at an internal bore in a body portion of the first locking coupler.

7. The tool holder according to claim 6, wherein the threads of the actuator and threads of the first locking coupler are buttress threads.

8. The tool holder according to claim 6, wherein the stem portion of the threaded actuator extends through a passage in a body portion of the second locking coupler to be threadably received in the internal bore of the first locking coupler.

9. The tool holder according to claim 1,
wherein the threaded actuator includes an abutment surface that is configured to engage an engagement surface of a body portion of the second locking coupler to thereby urge the second locking coupler into locking engagement with the first locking coupler when the actuator is in the lock position, and
wherein, when the actuator is in the release position, spacing is provided between the abutment surface and the engagement surface to thereby allow the second locking coupler to move axially away from the first locking coupler to the unlocked state for adjusting the angular orientation of the cage assembly relative to the holder handle.

10. The tool holder according to claim 9,
wherein the abutment surface is formed from a shoulder portion of the threaded actuator, and
wherein the engagement surface is formed from an axial end portion of the second locking coupler.

11. The tool holder according to claim 1, wherein the threaded actuator includes an external hexagonally shaped knob configured for operation by a hand of a user, and wherein the through-openings in the supports are hexagonal shaped.

12. The tool holder according to claim 1,
wherein the clamp includes a screw operably coupled to the clamp for transverse movement in opposite directions between the supports,
wherein the supports are joined together by a cross member,
wherein the screw is threadedly received in a threaded bore in the cross member, the screw and the threaded bore having double-lead Acme threads, and
wherein the screw includes a hexagonally shaped knob configured for operation by a hand of a user.

13. The tool holder according to claim 1, wherein the tool holder consists of only five separate parts comprising the threaded actuator, the cage assembly, the clamp, a screw operably coupled to the clamp, and the holder handle.

14. The tool holder according to claim 1, wherein all parts of the tool holder are made from injection molded plastic.

15. A display packaging in combination with the tool holder according to claim 1, wherein the display packaging at least partially encloses a portion of the tool holder, and the display packaging having one or more openings in which one or more portions of the tool holder extend therethrough.

16. The display packaging according to claim 15 wherein the one or more openings includes a first opening in which a portion of a knob of the threaded actuator extends therethrough, the first opening being bounded by a sidewall that supports the tool holder in the packaging.

17. The display packaging according to claim 15, wherein a bottom of the package is open, and in which the cage assembly extends through the open bottom, and wherein respective bottom portions of a front and back sidewall of the packaging each have a cutout portion that matches a shape of the outer surface of the respective supports.

18. A kit, comprising:
the tool holder according to claim 1, and
a package that at least partially contains the tool holder.

19. A tool holder for firmly holding a wide range of sizes and shapes of tool handles, the tool holder comprising:
a holder handle;
a cage assembly comprising a pair of axially spaced apart supports having axially aligned through openings formed by respective inwardly facing surfaces of the supports, wherein the openings are sized for receiving tool handles of different sizes and shapes through both of the aligned openings;
a clamp transversely movable between the supports in opposite directions toward and away from the respective inwardly facing surfaces of the supports for releasably clamping the tool handle against the inwardly facing surfaces;

a locking coupling interposed between the holder handle and the cage assembly for selectively adjusting the angular orientation of the cage assembly relative to the holder handle, wherein the locking coupling includes a first locking coupler operably coupled to the cage assembly, and a second locking coupler operably coupled to the holder handle; and a threaded actuator that is operable to interact with the locking coupling for permitting or restricting adjustment of the angular orientation of the cage assembly relative to the holder handle, wherein the threaded actuator is threadably moveable relative to the locking coupling between a lock position and a release position wherein the threaded actuator includes a radially outward circumferential groove, and the second locking coupler includes a radially inwardly extending protrusion that is configured to move along a length of the groove when the actuator is moved between the lock and release positions, and wherein the lock position of the threaded actuator causes the locking coupling to be in a locked state that restricts adjustment of the angular orientation of the cage assembly relative to the holder handle, and wherein the release position of the threaded actuator causes the locking coupling to be in an unlocked state that permits adjustment of the angular orientation of the cage assembly relative to the holder handle.

20. The tool holder according to claim 19, wherein one end of the groove is formed by a radially outwardly extending protrusion on the threaded actuator, and wherein engagement of the radially inwardly extending protrusion of the second locking coupler and the radially outwardly extending protrusion of the actuator serves as a stop to restrict removal of the threaded actuator from the second locking coupler.

* * * * *